July 26, 1966 H. EPSTEIN ET AL 3,263,234
APPARATUS AND METHOD OF ELECTROSTATIC RECORDING
Filed Oct. 4, 1961
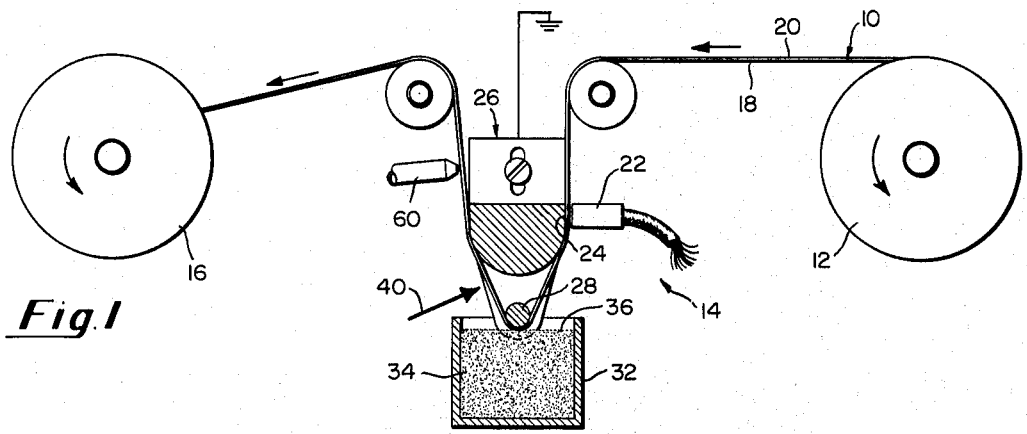
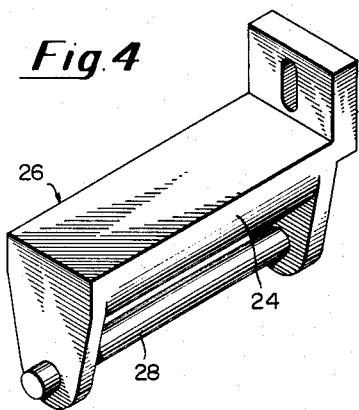
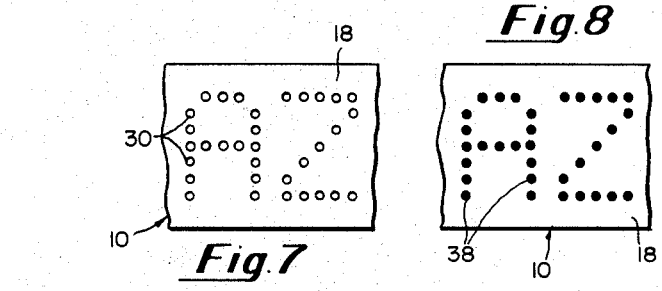
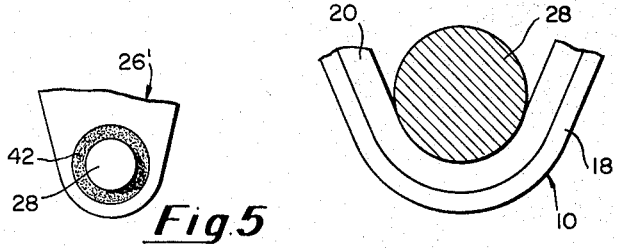
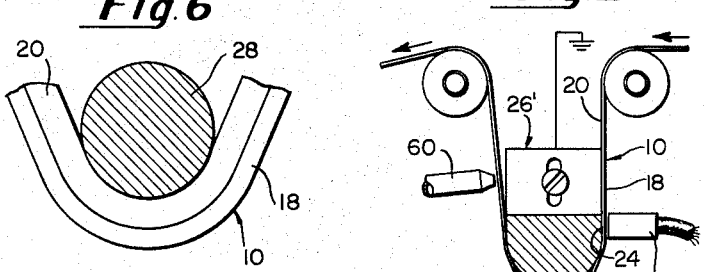
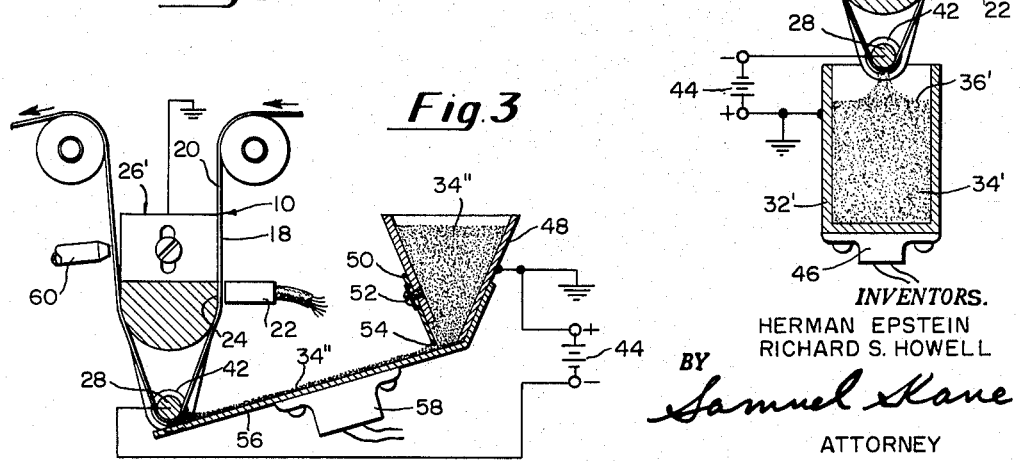
INVENTORS.
HERMAN EPSTEIN
RICHARD S. HOWELL
BY Samuel Kane
ATTORNEY

United States Patent Office 3,263,234
Patented July 26, 1966

3,263,234
APPARATUS AND METHOD OF ELECTRO-
STATIC RECORDING
Herman Epstein, Melrose Park, and Richard S. Howell, King of Prussia, Pa., assignors to Burroughs Corporation, Detroit, Mich., a corporation of Michigan
Filed Oct. 4, 1961, Ser. No. 142,834
10 Claims. (Cl. 346—74)

This invention relates generally to electrostatic recording and more particularly to apparatus and methods of inking electrostatically charged regions on a record medium representative of information.

In the so-called "electrostatic" printing process, information to be recorded is first formed as invisible electrostatically charged regions on a record medium by means of electrical discharges emanating from one or more electrodes generally contained in a print head. The operation of electrostatically charging the record medium has been designated "printing." After the record medium is thus printed, it is exposed to a developer in the form of finely divided pigmented electrically conductive ink in powder form by moving it through an ink bath to cause ink particles to cling to the charged regions thereon and thereby make the latent electrostatic image visible. Movement of the record medium has had to be accomplished through a considerable distance because of its being drawn through the ink bath, the result being that the developed image has not been visible as soon as might be desired in some applications.

The principal object of the present invention is to provide apparatus and methods of electrostatic recording whereby the printed information on the record medium may be inked and made visible within a very short distance from the position where printing occurs.

Another object of the invention is to eliminate the ink bath and to so arrange the ink supply that the record medium will have to be moved only through a very short distance from the print position to the ink supply.

Another object of the invention is to provide apparatus and methods of electrostatic recording whereby the distance between the record medium and the ink supply need not be critical.

A more specific object of the invention is to provide apparatus and methods of electrostatic recording by means of which contact of the unrecorded back surface of the record medium with the ink supply will be avoided.

In accordance with the above objects and first considered briefly in its broad aspects, the invention comprises means for so guiding a movable printed record medium and means for positioning a supply of ink relative to the guiding means such that inking will occur on the record medium when it is moved only a short distance into the vicinity of the ink supply. In a variation of the invention means are provided for establishing an electric field in the path of movement of the printed record medium in such manner that the forces of the electric field and the forces of the electrostatic charges on the record medium will combine to provide a force of attraction to cause ink particles to move away from the ink supply and adhere to the electrostatically charged regions on the record medium.

The invention will be more clearly understood when the following detailed description of specific embodiments thereof is read in conjunction with the accompanying drawings in which:

FIG. 1 is a diagrammatic view of an electrostatic recording apparatus embodying principles of the invention;

FIGS. 2 and 3 show modifications of the apparatus of FIG. 1;

FIG. 4 is an isometric view of a back electrode and showing also a guide rod for the record medium;

FIG. 5 is an enlarged view of a fragment of the apparatus of FIG. 2 showing the guide rod insulated from the back electrode;

FIG. 6 is an enlarged fragment applicable to FIGS. 1, 2 and 3 showing the guide rod in section and illustrating a laminar construction of the record medium;

FIG. 7 shows a fragment of the record medium after it has been printed or impressed with electrostatic charges; the charges being shown as visible circular regions for purposes of illustration; and FIG. 8 shows the fragment of the record medium after the latent image has been developed or inked.

Turning now to the drawings and first with reference to FIG. 1 thereof, a record medium 10, in the form of a web, is paid out or drawn from a rotatable supply reel 12. The record medium 10 passes through recording apparatus 14 and is collected on a take-up reel 16 which may be rotated by any suitable device, not shown, forming no part of the present invention. As shown in FIG. 6, the record medium 10 is composed of two layers, a dielectric surface 18 and an electrically conductive backing 20. It is understood that this construction is illustrative only since the record medium 10 may consist of a single sheet or web of dielectric material or if constructed in laminar form, as shown, the backing 20 need not be electrically conductive.

The record medium 10 (FIG. 1) passes between a print head 22 and an anvil surface 24 (FIG. 4) of a back electrode 26, and thence around a guide rod 28. The print head 22 may, for example, be of the kind shown in U.S. Patent No. 2,955,894 in which case it would contain a matrix of pin electrodes, not shown, each pin electrode adapted to be energized for printing or impressing an electrostatic charge 30 (FIG. 7) on the dielectric surface 18 in accordance with predetermined patterns. For purposes of illustration, the patterns of charges 30 shown in FIG. 7 are formed as letters "A" and "Z."

A container 32 (FIG. 1) holding a supply of finely divided electrically conductive pigmented ink 34 in powder form is positioned adjacent the guide rod 28 with the level 36 of the ink substantially tangent to the dielectric surface 18. As the take-up reel 16 is rotated to advance the record medium 10, the printed patterns of electrostatic charges 30 will be advanced therewith from the printing position at the print head 22 across the level 36 of the ink 34 to attract particles of ink to the charges 30 and make the latent electrostatic image visible, as depicted in FIG. 8. The darkened spots or regions 38 indicate the adhesion of ink particles 34 to the latent electrostatic charges, indicated by the circles 30 in FIG. 7.

A short additional movement of the record medium 10, by rotation of the take-up reel 16, will move the inked image depicted by the spots 38 from the vicinity of the guide rod 28 to a viewing position indicated by an arrow 40. Thus by moving the record medium tangentially relative to the ink supply the electrostatic printing is inked within a very short distance of the print head 22, and the inked image brought into viewing position within a very short distance after inking. In an actual model, constructed on a reduced scale from that shown in FIG. 1, the distance from the print position at the print head 22 to the viewing position 40 was $\frac{3}{8}''$ measured along the path of movement of the record medium 10.

As the take-up reel 16 is rotated and successive printing on the record medium 10 picks up ink particles from the supply 34 the level 36 of the ink supply may be maintained substantially constant by any suitable means, not shown, forming no part of the present invention.

FIG. 2 shows a modification in which the level 36' of the ink supply 34' is spaced from the guide rod 28 and in which the spacing is not a critical as the tangent arrangement in the construction of FIG. 1. In this modification the guide rod 28 is insulated from the back electrode 26′, as by insulating bushings 42 (FIG. 5), and the container 32′ (FIG. 2) is constructed of electrically conductive material. As the record medium 10 is drawn around the guide rod 28 during operation, a voltage, preferably from a D.C. source 44 of the same polarity as the electrostatic charges 30, is applied to the guide rod 28 to obtain a substantial difference in potential between the guide rod 28 and the electrically conductive ink 34′. The application of this voltage and the establishment of this potential difference have the effect of causing ink particles at the level 36′ to jump the gap from the level to the dielectric surface 18, in a manner as though they were drawn by suction, and adhere to the electrostatic charges 30 to effect inking of the electrostatic image on the record medium 10. Satisfactory results have been obtained in one instance where the potential difference between the guide rod 28 and ink 34′ was approximately 1000 volts. It has been found preferable to vibrate the container 32′ by means of a vibrator 46. By vibrating the container 32′, particles of ink 34′ are caused to leave the surface or level 36′ thereof, in the manner of a vapor or cloud, thereby facilitating attraction of the ink particles 34′ to the electrostatic charges 30 on the record medium 10.

As mentioned above, the voltage applied to the guide rod 28 is of the same polarity as the electrostatic charges 30. In the present illustrations, the electrostatic charges 30 are regarded as negative to correspond with the polarity of the D.C. source 44, as shown. If the polarity of the electrostatic charges 30 were positive, the polarity of the D.C. source 44 would be the reverse of that shown in the drawings.

FIG. 3 shows another modification in which a voltage is applied to the guide rod 28 in a manner similar to that described for the modification shown in FIG. 2. In this case the supply of ink 34″ is contained in an electrically conductive hopper 48 provided with a gate 50 adjustably secured by means of a clamping screw 52 to provide an opening 54 at the bottom of the hopper 48 for metering the flow of ink 34″. An electrically conductive inclined slide 56, substantially tangent to the dielectric surface 18 of the record medium 10, is secured to the hopper 48 and provided with a vibrator 58 to impart vibratory motion to the hopper 48 and slide 56 for suitably regulating the flow of metered ink 34″ from the opening 54 down and along the upper surface of the slide 56. As voltage is applied to the guide rod 28 during operation, particles of ink 34″ moving down the slide 56 will be accelerated and rapidly attracted to the dielectric surface 18 and electrostatic charges 30 thereon, in a suction-like manner, to effect inking of the latent electrostatic image.

In the modifications shown in FIGS. 2 and 3, it will be noted that the voltage applied to the guide rod 28 from the D.C. source 44 will establish an electric field between the guide rod and the ink and that the force of attraction of this electric field will add to the forces of attraction of the electrostatic charges on the record medium to cause the ink particles to adhere much more strongly to the dielectric surface than they did in prior art methods.

FIGS. 1, 2 and 3 show a pipe 60 arranged subsequent to the viewing position 40 in the direction of movement of the record medium 10. The pipe 60 communicates with a source of suction, not shown, for removing excess ink particles from the uncharged regions of the dielectric surface 18. Subsequent to the viewing position 40 or suction pipe 60, the record medium 10 is shown as leading directly to the take-up reel 16, however, this showing is illustrative only since the record medium 10 may first lead to other devices for calendering or fixing the inked image, or for other processing.

While there have been shown specific constructions illustrative of the principles of the invention, it is to be understood that these are preferred embodiments thereof and the invention is capable of being constructed and practiced in a variety of shapes, sizes, modifications and methods without departing from the true spirit and scope thereof. Accordingly, it is to be understood that the invention is not to be limited by the specific structures and methods disclosed but only by the sub-joined claims.

What is claimed is:

1. In recording apparatus having a print head for impressing a dielectric surface of a movable record medium with a latent pattern of one or more electrostatic charges representative of information, the combination comprising, an electrically conductive member closely adjacent said print head for guiding a said charged record medium as it is moved past said print head, means for metering electrically conductive ink from a supply of such ink and for causing the metered ink to flow toward said dielectric surface and the electrostatic charges thereon, and a single means in circuit with said ink for charging said ink and for simultaneously applying a D.C. voltage of the same polarity as said electrostatic charges to said member to obtain a difference in potential of approximately 1000 volts between said member and said electrically conductive ink, to cause said approaching ink to accelerate and attract rapidly to said electrostatic charges on the guided portion of said record medium, to render said latent pattern of electrostatic charges immediately visible.

2. In recording apparatus having a print head for impressing a surface of a movable record medium with an electrostatic charge representative of information, the combination comprising, means including a single elongate electrode rod closely adjacent said print head for guiding a said charged record medium as it is moved past said print head, said rod having its axis parallel to said record medium and being at least coextensive in length with the width of said record medium, a vessel for containing a supply of electrically conductive ink, the level of said ink supply spaced from and forming a gap with said rod and with the portion of said record medium guided thereby, a single means in circuit with said ink for charging said ink and for simultaneously applying a voltage of the same polarity as said electrostatic charge to said rod to obtain a substantial difference in potential between said rod and said electrically conductive ink, to cause particles of said ink to flow from said level to bridge said gap and adhere to said electrostatic charge on the guided portion of said record medium, and means to vibrate said ink supply to aid the ink in said bridging of said gap.

3. In electrostatic recording apparatus having a print head for impressing a surface of a movable record medium with one or more electrostatic charges representative of information, the combination comprising, a single elongate electrode member closely adjacent said print head for guiding a said charged record medium as it is moved past said print head, said member having its longitudinal dimension extending across and at least coextensive in length with the width of said record medium, a container for holding a supply of electrically conductive ink, the level of said ink supply spaced from and forming a gap with said member and with the portion of said record medium guided thereby, and a single means in circuit with said ink for charging said ink and for simultaneously applying a voltage of the same polarity as said electrostatic charges to said member to obtain a substantial difference in potential between said member and said electrically conductive ink, to cause particles of said ink to flow from said level to bridge said gap and adhere to said electrostatic charges on the guided portion of said record medium.

4. In electrostatic recording apparatus having a print head for impressing a dielectric surface of a movable record medium with a pattern of one or more electrostatic charges representative of information, the combination comprising, means closely adjacent said print head for guiding a said charged record medium in a curved path as it is moved past said print head, and a box-like container for holding a supply of electrically conductive ink, the horizontal level of the ink supply being substantially tangent to the curved portion of said record medium and substantially contacting only said dielectric surface and the electrostatic charges thereon in the curved portion of said record medium.

5. In recording apparatus having a print head for impressing a surface of a movable record medium with a latent pattern of one or more electrostatic charges representative of information, the combination comprising, means closely adjacent said print head for guiding a said charged record medium in a substantially V-shaped path after it is moved past said print head, the apex of said V-shaped path having a curvature, and means for applying the horizontal level of a supply of electrically conductive ink tangentially to said surface of said record medium and to the electrostatic charges thereon in the vicinity of said curvature of the apex of said V-shaped path to render said latent pattern of electrostatic charges visible, said guiding means being ararnged such that said visible pattern will be exposed to view substantially immediately after said application of said electrically conductive ink.

6. A method of electrostatic recording which comprises, impressing one surface of a dielectric sheet—or web-like record medium with an electrostatic charge representative of information, moving the dielectric record medium across a supply of electrically conductive ink with said one surface facing and forming a gap with the level of said ink supply, and establishing an electric field in such manner that it passes through said dielectric record medium from a region at the opposite surface thereof to said electrically conductive ink through said gap, the forces of said electric field and said electrostatic charge being additive to provide a force of attraction to cause ink to bridge said gap and adhere to said electrostatic charge.

7. A method according to claim 6 characterized further by vibrating said ink supply to cause particles of ink to leave said level of the ink supply to aid in said bridging of said gap.

8. A method of electrostatic recording which comprises, impressing one surface of a sheet—or web-like record medium with an electrostatic charge representative of information, moving the record medium adjacent electrically conductive ink, and establishing an electric field in the path of movement of said record medium in such manner that the forces of the electric field and said electrostatic charge will add to provide a force of attraction to cause particles of said ink to adhere strongly to said electrostatically charged region of said surface.

9. A method according to claim 8 characterized further by vibrating said electrically conductive ink to cause particles thereof to move toward said one surface of said record medium.

10. A method of electrostatic recording which comprises, impressing a dielectric surface of a flexible record medium with an electrostatic charge representative of information, and bending the record medium and moving it in a correspondingly curved path across the horizontal level of a supply of electrically conductive ink held in a suitable container, the level of said ink supply being substantially tangent to said dielectric surface of the bent record medium to enable said electrostatic charge to attract ink particles during said movement.

References Cited by the Examiner

UNITED STATES PATENTS

| | | | |
|---|---|---|---|
| 2,446,928 | 4/1948 | Hudgdon | 346—74 X |
| 2,633,796 | 4/1953 | Pethick | 346—74 X |
| 2,725,304 | 11/1955 | Landigan et al. | 346—74 |
| 2,726,166 | 12/1955 | Greaves | 117—21 |
| 2,817,598 | 12/1957 | Hayford | 346—74 X |
| 2,820,716 | 1/1958 | Harmon et al. | 117—17.5 |
| 2,901,374 | 8/1959 | Gundlach | 346—74 X |
| 2,910,964 | 11/1959 | Stavrakis et al. | 346—74 X |
| 2,932,690 | 4/1960 | Adams et al. | 346—74 X |
| 3,040,704 | 6/1962 | Bliss | 117—17.5 |
| 3,152,012 | 10/1964 | Schaffert | 118—637 |

OTHER REFERENCES

Page 6, October 1958—Publication No. 1—IBM Technical Disclosure Bulletin, Schaffert, Development of Electrostatic Images, vol. 1, No. 3.

Page 24, March 1962—IBM Technical Disclosure Bulletin—Development of Electrostatic Images, Schaffert, vol. 4, No. 10.

BERNARD KONICK, *Primary Examiner.*

IRVING L. SRAGOW, *Examiner.*

R. M. JENNINGS, J. F. BREIMAYER,
*Assistant Examiners.*